(12) United States Patent
Pierson et al.

(10) Patent No.: US 12,330,078 B2
(45) Date of Patent: Jun. 17, 2025

(54) MULTI-CHANNEL MODEL TRAIN SOUND OPTIMIZATION SYSTEM AND METHOD

(71) Applicants: Martin Pierson, Ormond Beach, FL (US); Joseph Goddard, Ormond Beach, FL (US)

(72) Inventors: Martin Pierson, Ormond Beach, FL (US); Joseph Goddard, Ormond Beach, FL (US)

( * ) Notice: Subject to any disclaimer, the term of this patent is extended or adjusted under 35 U.S.C. 154(b) by 450 days.

(21) Appl. No.: 17/955,944

(22) Filed: Sep. 29, 2022

(65) Prior Publication Data
US 2024/0115966 A1 Apr. 11, 2024

(51) Int. Cl.
*A63H 19/14* (2006.01)
*G06F 3/16* (2006.01)
*A63H 19/24* (2006.01)

(52) U.S. Cl.
CPC ............. *A63H 19/14* (2013.01); *G06F 3/165* (2013.01); *A63H 19/24* (2013.01)

(58) Field of Classification Search
CPC .......... A63H 19/14; A63H 19/24; G06F 3/16; G06F 3/165

USPC ............................................. 381/80
See application file for complete search history.

(56) References Cited

U.S. PATENT DOCUMENTS

| | | | | |
|---|---|---|---|---|
| 11,809,774 B1* | 11/2023 | Vitt | ...................... | H04R 1/1008 |
| 2002/0124715 A1* | 9/2002 | Fay | ...................... | G10H 1/183 |
| | | | | 84/645 |
| 2005/0194204 A1* | 9/2005 | Severson | ............. | H04R 1/2803 |
| | | | | 181/141 |
| 2007/0288109 A1* | 12/2007 | Zahornacky | ........... | A63H 19/14 |
| | | | | 700/94 |
| 2008/0015862 A1* | 1/2008 | Grubba | .................. | A63H 19/14 |
| | | | | 704/270 |
| 2019/0306650 A1* | 10/2019 | Jin | .......................... | H04R 5/04 |
| 2019/0387344 A1* | 12/2019 | Kim | ........................ | H04R 5/04 |
| 2020/0336857 A1* | 10/2020 | Kim | ........................ | H04R 5/04 |

* cited by examiner

*Primary Examiner* — Harry S Hong
(74) *Attorney, Agent, or Firm* — J. Wiley Horton

(57) ABSTRACT

A multi-channel model train sound reproduction system, in which digital sound files are assigned to a particular channel. The channel assignment may be fixed or variable depending on operation state. For the variable embodiments, channel assignment is preferably done in real time according to the configuration that will produce the highest quality sound reproduction.

14 Claims, 5 Drawing Sheets

MULTI-CHANNEL MODEL TRAIN SOUND OPTIMIZATION SYSTEM AND METHOD

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of model trains. More specifically, the invention comprises a system and method for routing retrieved sound files to multiple channels in order to improve sound quality and minimize interference.

2. Description of the Related Art

The overarching goal for most model train enthusiasts is operational realism. The physical appearance of a model train is made to match the physical appearance of the full-scale train as closely as possible. Sophisticated motion control systems are employed so that the model train closely matches the motion of the full-scale train. The same principle applies to the sounds produced by the model train. On-board digital sound reproduction systems are now used in model trains. These mimic many sounds made by a full-scale train—including rumbling engine noises, brake squeals, the hiss of pneumatic systems, and radio transmission sounds.

FIG. 1 shows an exemplary prior art model train 10. The motion-producing components are generally part of chassis 12. Removable shell 14 is added to match the appearance of the full-scale train. Shell 14 may also mount functional components—such as headlights and ditch lights.

FIG. 2 shows the assembly of FIG. 1 with shell 14 removed from chassis 12. The reader will note that the couplers are also removed—which is often part of the disassembly process. Frame 24 is mounted atop chassis 12. Electric motor 16 is contained within the frame. The motor provides rotational power through two drive shafts 18. One drive shaft extends forward to a reduction gear 20 sitting atop the forward truck 22. A second drive shaft extends rearward to a second reduction gear sitting atop the rearward truck 22.

In this example, each reduction gear 20 feeds rotational power from the motor into its associated truck 22, while also stepping down the rotational speed. Using this drivetrain, motor 16 provides driving torque to the rotating wheels within each truck. At least some of the rotating wheels within each truck provide a conductive path to the rails along which the train travels (some of the wheels may be provided with a rubber traction-enhancing surface as well). This conductive path provides electrical power to motor 16. In the example shown, the conductive path also provides digital communication signals that are carried over the rails. Several standards exist for providing digital communications over the rails of a model train layout, with the most common standard being the Digital Command Control ("DCC") protocol as defined by the National Model Railroad Association.

Train controller 30 is mounted on frame 24. In this example, the train controller is a sophisticated series of circuits involving a microprocessor, digital memory, a motor controller, and other functions—all of which are mounted on a printed circuit board. Connectors 34 provide electrical communication between train controller 30 and other components—such as the lights mounted in shell 14.

Sound controller 32 is provided to produce realistic operating sounds for the model train. The sound controller is linked to the train controller 30 so that the sounds produced correspond to the actions of the model train. As an example, if train controller 30 moves the model train forward, then sound controller 32 is programmed to produce engine sounds corresponding to a full-scale train beginning to move and accelerate away.

Sound controller 32 includes a digital memory containing various sound files. These are retrieved as needed. They are then sent through a digital-to-analog converter before being amplified and sent to speaker 28. Speaker 28 is mounted within opening 26 in frame 24. A speaker can be mounted in many locations—including within shell 14, within a steam engine tender, in a car other than a locomotive, etc. Frame 24 provides a good mounting location, however, since it is preferable to place a speaker in a barrier material that will reduce phase cancellation between the front of the speaker and the rear of the speaker. FIG. 2 shows speaker 28 moved away from opening 26. When installed, speaker 28 is placed within opening 26 and secured.

The system illustrated in FIG. 2 is able to create a wide variety of realistic sounds. However, the use of a single sound channel can cause problems, particularly when multiple sounds compete for space in the audio spectrum. A good example is the continuous playing of a rumbling diesel engine noise. Sound controller 32 retrieves a sound file corresponding to the diesel engine noise and plays it repetitively. If, at the same time, a metal-on-metal squealing noise is desired—both must be transmitted on a single channel and produced by a single speaker 28. It would be preferable to provide an audio system with two or more sound channels, where the system automatically assigns a particular sound to a particular channel in order to reduce conflicts. The present invention provides such a system.

BRIEF SUMMARY OF THE PRESENT INVENTION

The present invention comprises a multi-channel model train sound reproduction system, in which digital sound files are assigned to a particular channel. The channel assignment may be fixed or variable depending on the operational state of the model train. For the variable embodiments, channel assignment is preferably done in real time according to the configuration that will produce the highest quality sound reproduction.

Figure 1:
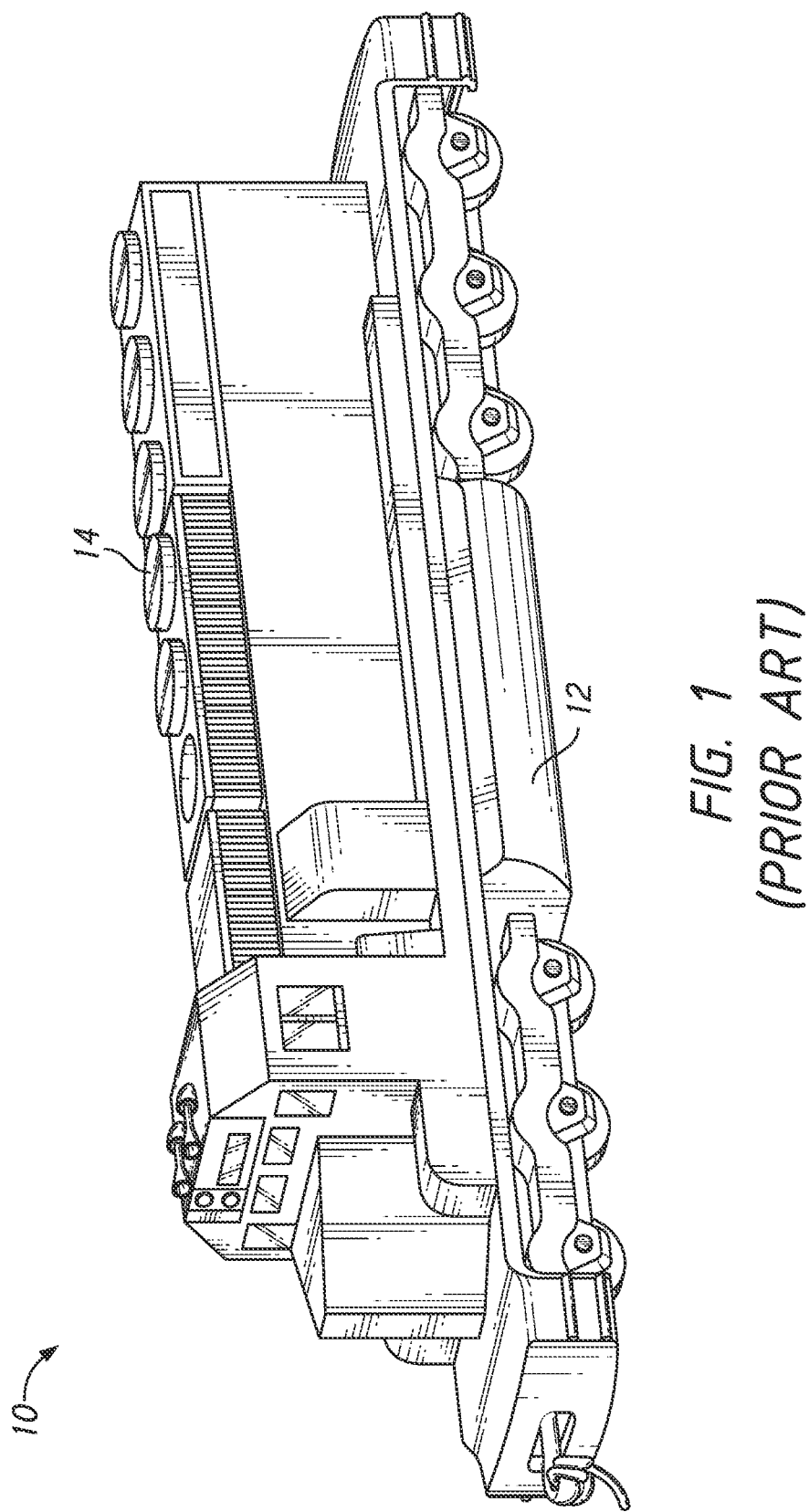
FIG. 1 is a perspective view, showing a prior art model train.
Figure 2:
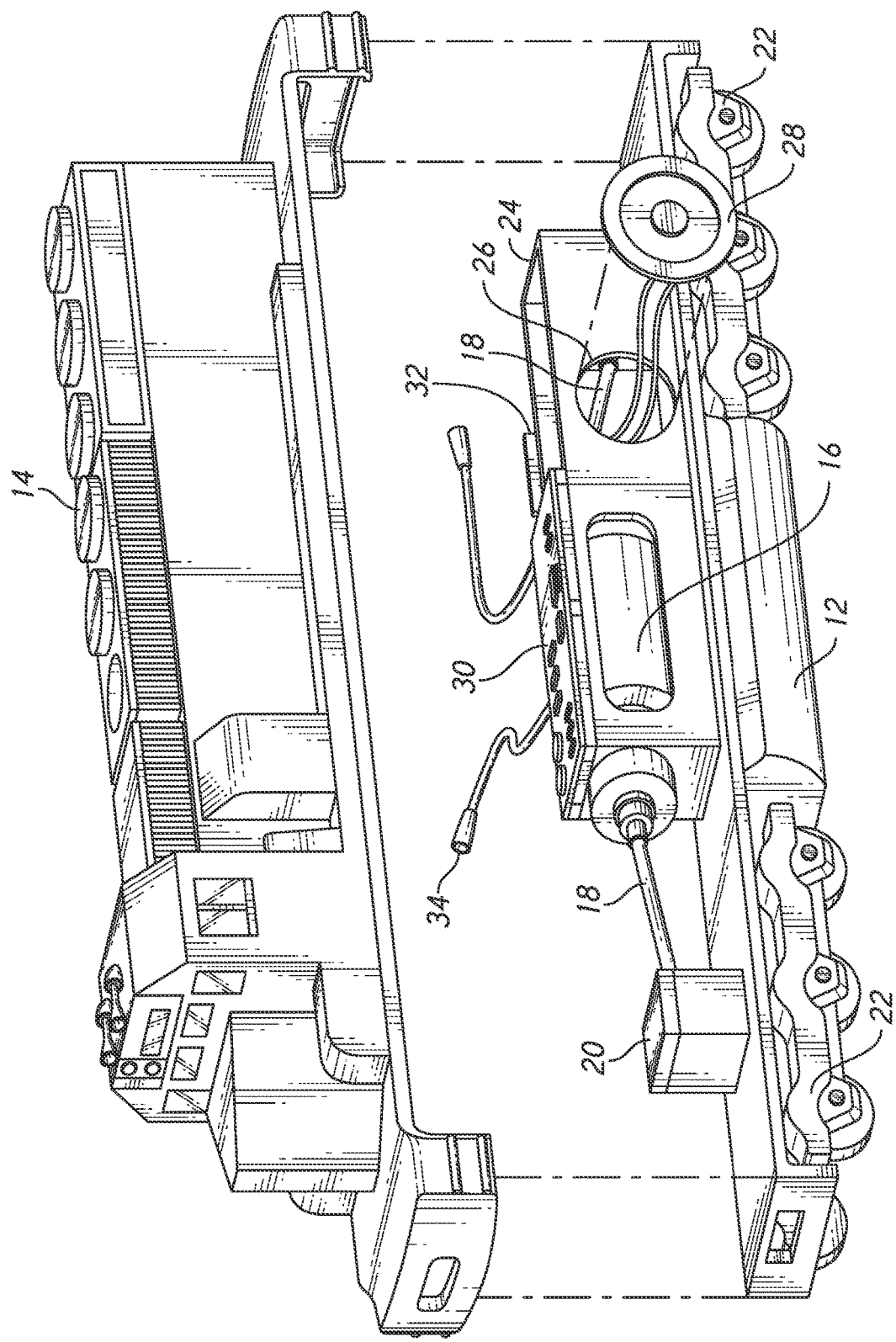
FIG. 2 is an exploded perspective view, showing the model train of FIG. 1 with the shell removed from the chassis.

REFERENCE NUMERALS IN THE DRAWINGS 10 model train
12 chassis
14 shell
16 motor
18 drive shaft
20 reduction gearbox
22 truck
24 frame
26 opening
28 speaker
30 train controller
32 sound controller
34 connector
36 extension
38 opening
40 speaker
42 speaker lead
44 speaker lead
46 sound memory
48 microprocessor
50 digital-to-analog converter
52 filter
54 amplifier
56 digital-to-analog converter
58 filter
60 amplifier
62 input/output port
64 track
66 decoder
68 power supply
70 microprocessor
72 memory
74 motor controller
76 motor
78 analog-to-digital converter
80 retrieve sound file step
82 retrieve assigned channel step
84 evaluate duty cycle step
86 compatibility check step
88 transmission step
90 transmission step

DETAILED DESCRIPTION OF THE INVENTION

The present invention can be realized in a wide range of physical/electrical/software embodiments. One skilled in the art—having reviewed the following detailed descriptions—will envision many more embodiments. Accordingly, the scope of the invention should be fixed by the claims rather than the specific examples provided.

Figure 3:
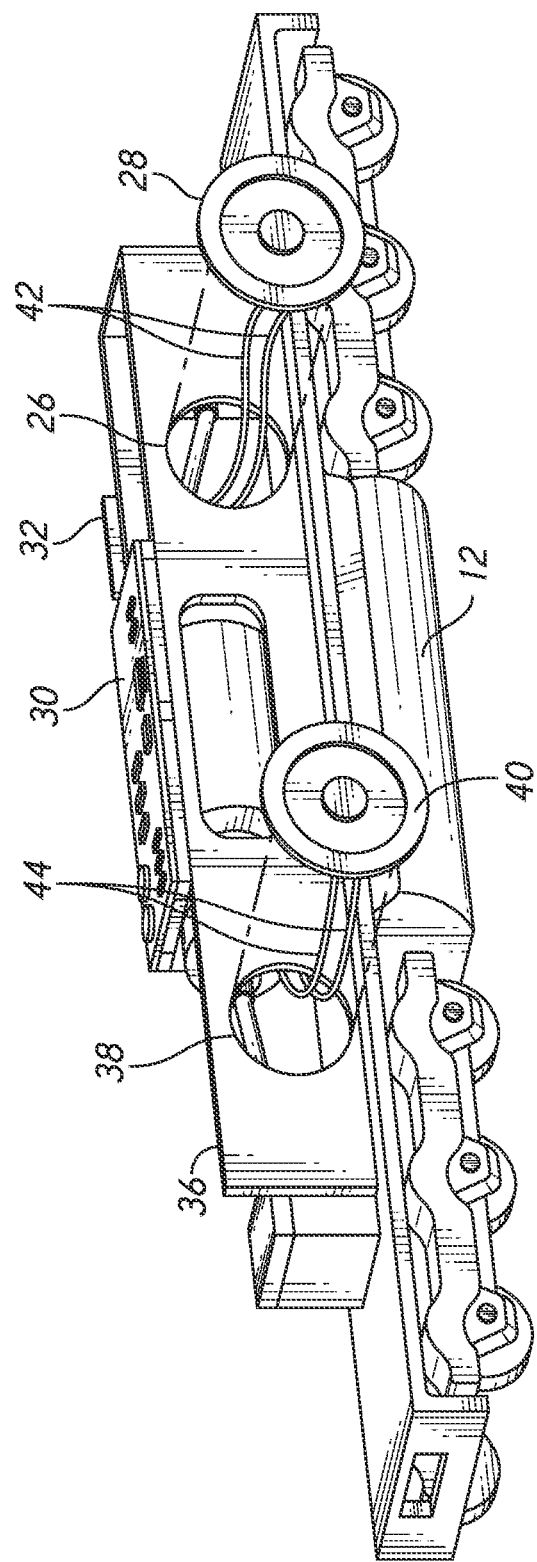
FIG. 3 is an exploded perspective view, showing an embodiment of the present invention.

FIG. 3 provides an illustration of one exemplary embodiment of the present invention. In this example, a model train sound system having two separate channels is provided. A second speaker 40 is added to reproduce the sounds of the second channel. This second speaker can be mounted in any suitable location. In this example, extension 36 is added to the frame and opening 38 is provided in extension 36.

Speaker 40 is mounted within opening 38 just as speaker 28 is mounted within opening 26. Speaker leads 42 connect speaker 28 to sound controller 32. Speaker leads 44 connect speaker 40 to sound controller 32.

Figure 4:
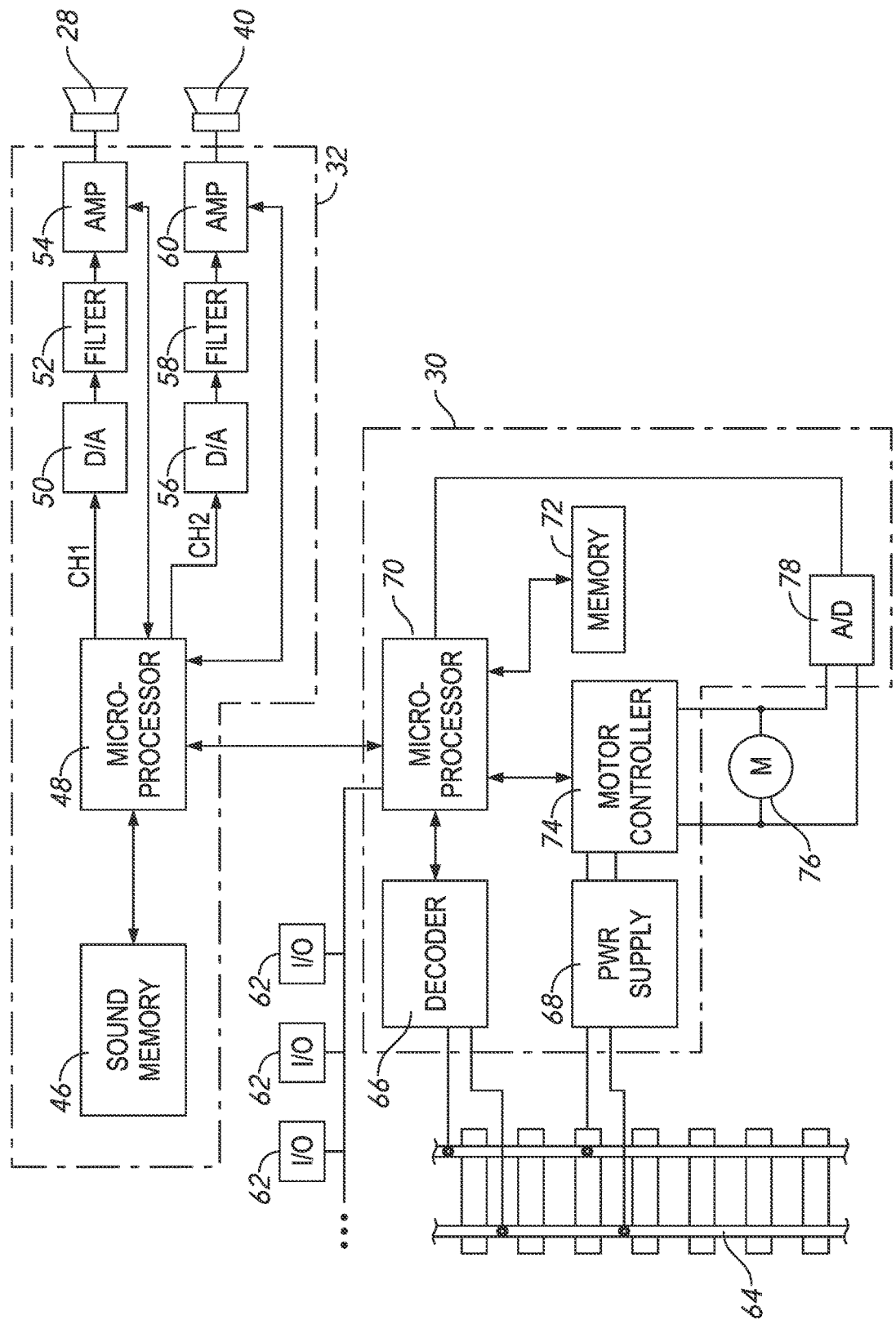
FIG. 4 is a schematic view, showing an exemplary sound controller made according to the present invention.

As described previously, sound controller 32 is in communication with train controller 30 (which controls the motions and other functions of the model train). FIG. 4 provides an exemplary block diagram to assist the reader in understanding the operations of train controller 30 and sound controller 32.

Train controller 30 includes at its heart a microprocessor 70, which retrieves and runs software stored internally and on external memory 72. The software governs the actions taken by the microprocessor. Electrical power and digital communications are provided to the train controller via track 64. Track 64 is simply the track over which the model train runs. It includes two electrically isolated conductors in the form of the rails themselves. In this example, the DCC communication protocol is used—though the invention is by no means dependent on the use of digital track communications.

Under the DCC protocol, a steady DC voltage is maintained across the two rails in track 64. Digital messages are superimposed upon the power signal by switching the polarity. Power supply 68 includes a rectifier circuit that removes the polarity reversals and provides steady DC power to motor controller 74. In this example, the power supply also provides electrical power to all the other components on board the train. These connections are not shown for purposes of visual clarity.

Decoder 66 monitors the polarity reversals on track 64 and decodes them as digital messages that are sent to microprocessor 70. As an example, a remote train controller can be used to enter a digital speed command. The DCC system encodes this speed command into polarity reversals that are placed on track 64. Decoder 66 decodes this speed command and sends it to microprocessor 70, which then uses it to control the speed of the train.

Motor controller 74 is a separate component in the example of FIG. 4, though in other embodiments it will be incorporated as an internal function of microprocessor 70. The motor controller receives a desired drive state from microprocessor 70 and controls the current passed to motor 76 (which provided motive force to the model train). The particular motor controller shown uses pulse width current modulation to create a desired driving voltage wave for the motor.

During zero-crossing points for the motor voltage the back electromotive force ("back EMF") produced by the motor is monitored and converted to a digital message by analog-to-digital converter 78. This digital information is then fed back to motor controller 74 so that the motor controller can provide closed-loop control. The components of train controller 30 are just one example among many possibilities. Those skilled in the art will know that many other train controller configurations are known.

Microprocessor 70 also includes numerous I/O ports 62. Most of these correspond to output functions controlled by the train controller—such as lights, smoke generators, and couplers. Some implementations will include input functions as well—such as a proximity detector.

Sound controller 32 includes microprocessor 48 and its associated sound memory 46. Sound memory 46 includes many separate digital sound files corresponding to the sounds desired for a particular model train. As mentioned previously, microprocessor 48 communicates with microprocessor 70 in train controller 30. This communication link is preferred, since the sounds produced by sound controller 32 preferably correspond to the operations of the train.

In the embodiment depicted in FIG. 4, sound controller 32 includes two separate audio channels—labeled "CH1" and "CH2." These two channels are able to independently process sound files. Channel 1 sends a sound file to digital-to-analog converter 50. The converted signal then passes through a reconstruction filter 52, and an amplifier 54. The amplified audio signal is then sent to speaker 28, where it is converted into sound energy.

Channel 2 likewise sends a sound file to digital-to-analog converter 56. The converted signal on the second channel passes through filter 58 and amplifier 60. Speaker 40 then converts the amplified signal to sound energy. Thus, the embodiment shown in FIG. 4 is able to independently decode and amplify digital sound files on two separate audio channels.

Microprocessor 48 controls the amplifiers 54,60. This control is primarily used to set the gain, though in some instances equalization functions may be present as well. The communication between the microprocessor and the amplifiers can proceed in both directions—the significance of which will be explained subsequently.

The use of multiple audio channels in sound reproduction equipment is of course not new. As an example, it is well known to split audio signals into a left channel and a right channel in order to create a stereo effect that gives the sound a more realistic quality for a human listener. In that example the recording of the sound in made using a stereo microphone arrangement and the assignment to the left or right channel is made in the recording process itself. Thereafter the assignment does not change.

In the present invention the assignment of a sound file to a channel is not based on spatial orientation (such as left and right). Instead, the invention makes channel assignments to provide greater clarity in a saturated environment. Some examples will serve to illustrate these objectives.

As a first example, consider a sound file including the steady rumbling sound of a diesel engine operating at a high throttle setting. The digital sound file or files used for this effect will be repeated at regular intervals. A user may also command the sounding of a horn on the same model train. Full-scale trains typically use an air horn assembly comprising five individual horns—each with its own frequency. This produces a 5-tone chord, a tonally complex result. Part of the air horn chord lies in the same frequency spectrum as that used for the diesel sounds. If the horn sound is sent over the same channel used for the diesel rumble, the result is often garbled. Not only is the sound quality reduced, but the amplitude of one or both signals may be reduced. It is preferable to separate these two signals by using two separate channels.

As a second example, the reproduced sound can be given more depth by playing a first attribute of a sound effect on one channel and a second attribute of the same sound effect on a second channel. A steam whistle can be split in this way.

There are many different ways to enact the desired channel assignment. Each digital sound file typically includes a header indicating the nature of the file. As an example, the sound file headers may indicate 8 bit, 16 bit, stereo, or mono. An additional header component can be added indicating which channel (1 or 2). A channel assignment could then be made when the digital sound files are stored in memory. The assignment schemes that are possible for sequentially-stored sound files include:

(1) 1 ... 2 ... 1 ... 2 ... 1 ... 2 ...;
(2) 1 ... 1 ... 2 ... 2 ... 1 ... 1 ... 2 ... 2 ...; and
(3) A random number generator that assigns only 1 or 2.

It is also possible to store the sound files without any indication of channel assignment and assign the channel as they are retrieved. The assignment scheme can be an arbitrary ordering as explained in the preceding paragraph, a random assignment, or some other scheme.

It is also possible to perform a channel load analysis and use this information in selecting a channel for a particular sound file. The term "channel load analysis" means the overall sound load on a particular channel. It may be measured or determined in a variety of ways. The concept is to direct newly retrieved sound files to the channel with the lowest channel load.

Looking again at FIG. 4, the reader will note the fact that the amplifiers 54,60 are under the control of microprocessor 48. It is possible for the microprocessor to sample the RMS (root-mean-squared) voltage produced by each amplifier in real time. An instantaneous value can be used or a value that is averaged over a relatively short interval (such as 100 ms) can be used. Since the objective is simply determining which channel carries the lowest load, a comparison between the two is all that is needed.

In a scheme where RMS voltage averaged over time is used, one can then define a simple parameter A as:

$$A = \frac{\Sigma V_{RMS}(CH\ 1)}{\Sigma V_{RMS}(CH\ 2)}$$

This parameter is regularly calculated. If A is less than 1 then each new retrieved digital sound file is routed to channel 1. If A is equal to or greater than 1 then each new retrieved digital sound file is routed to channel 2. In this way, each file is routed to the channel having the lowest load.

While effective, this methodology (average RMS voltage) will not always ensure the desired result of high sound quality. The rumble of a diesel engine is often referred to as "prime mover noise." While steady, prime mover noise does not necessarily produce a high value for average RMS voltage. One can also measure amplifier duty cycle, which in this disclosure simply means the time in which a particular amplifier is transmitting a signal above the noise threshold within a given time interval as a percentage of the total time interval itself. Under this scheme, microprocessor 48 monitors the duty cycle on amplifier 28 and amplifier 40. When a new sound file is retrieved, the microprocessor sends the file to the channel having the lowest present duty cycle.

Using the two-channel configuration it is also possible to assign the same sound file to both channels. As an example, a steam whistle sound file could be played on channel 1 at a first volume level and on channel 2 at a second, lower volume level. It is also possible for the microprocessor to introduce a small delay between the channels. In the example of the steam whistle, the sound could be slightly delayed on channel 2 in addition to being played at a lower volume. In the example of prime mover noise, the sound file could also be played on both channels but at differing levels (and with the possible addition of a delay).

Figure 5:
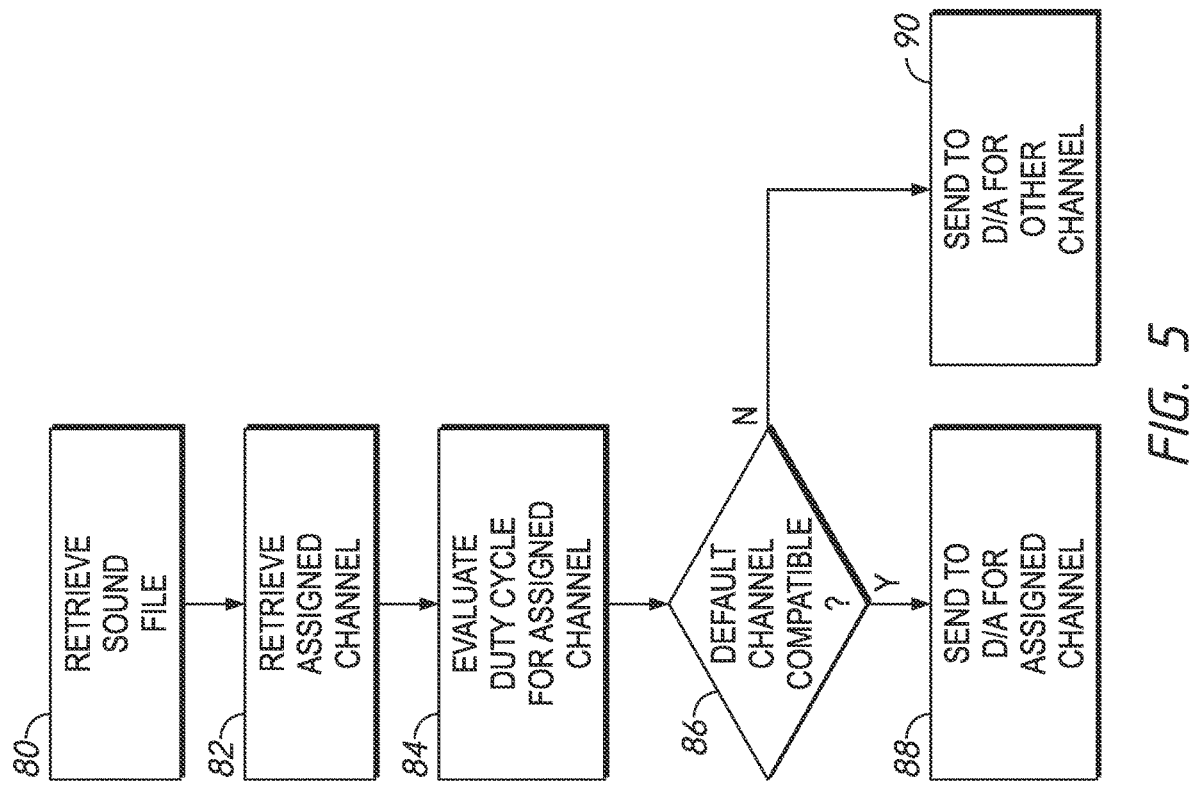
FIG. 5 is a flow chart, showing a decision process made by the software in an embodiment of the present invention.

FIG. 5 shows a decision process implemented by the software on microprocessor 48 for still another implementation. In this example each digital sound file is stored with a default channel assigned. In this example amplifier duty cycle is the measured value for analyzing channel load. The sound file is retrieved in step 80 and the channel assigned by default to that sound file is retrieved in step 82. The software next evaluates the current duty cycle of the amplifier on the default channel in step 84.

In step 86, the microprocessor considers whether the current duty cycle on the assigned channel is compatible. As an example, compatibility can be based on duty cycle. A duty cycle below a defined threshold (such as 30%) is deemed compatible. If this condition is satisfied, then the microprocessor sends the sound file to its default assigned channel (in step 88). If, on the other hand, the duty cycle is above the defined threshold then the microprocessor sends the sound file to the other channel (other than the default channel) in step 90.

Microprocessor 48 is preferably configurable to accommodate the hardware available. If the system is installed in a model train with only one speaker, then the microprocessor can be configured to route all the sound files to the single channel serving that speaker. Many other features are possible for the present invention, including the following:

1. A system having three or more channels can be provided. The analysis software would then consider the channel load for all three channels and send a sound file to the least loaded channel.
2. Some sound files could be stored with header information indicating that they are to be played on a first channel at a relatively high sound level and a second channel at a relatively low sound level. The channel selection can then be made on the basis of channel load, with the higher sound level being sent to the channel with a lower channel load.
3. The channel load measurement can be taken at a point before the amplifier.

Although the preceding description contains significant detail, it should not be construed as limiting the scope of the invention but rather as providing illustrations of the preferred embodiments of the invention. Numerous other permutations and modifications will be apparent to those skilled in the art. Thus, the scope of the invention should be fixed by the following claims rather than the examples given.

Having described my invention, we claim:

1. A method for selecting a channel for the playing of a digital sound file in a model train, comprising:
    (a) providing a sound controller, including,
        (i) a processor,
        (ii) a first sound channel connected to said processor,
        (iii) a second sound channel connected to said processor,
        (iv) a sound memory connected to said processor;
    (b) said processor determining a channel load for each of said first and second sound channels;
    (c) said processor retrieving a digital sound file from said sound memory; and
    (d) said processor routing said retrieved digital sound file to a sound channel having the lowest channel load.

2. The method for selecting a channel for the playing of a digital sound file in a model train as recited in claim 1, wherein said channel load for each of said sound channels is determined by determining an RMS voltage averaged over time for each of said sound channels.

3. The method for selecting a channel for the playing of a digital sound file in a model train as recited in claim 1, wherein said channel load for each of said sound channels is determined by determining a duty cycle for each of said sound channels.

4. The method for selecting a channel for the playing of a digital sound file in a model train as recited in claim 1, wherein:
    (a) each of said digital sound files has a default sound channel assigned; and
    (b) said processor routes said digital sound file to said default sound channel unless said default sound channel has the higher channel load.

5. The method for selecting a channel for the playing of a digital sound file in a model train as recited in claim 2, wherein:
    (a) each of said digital sound files has a default sound channel assigned; and
    (b) said processor routes said digital sound file to said default sound channel unless said default sound channel has the higher channel load.

6. The method for selecting a channel for the playing of a digital sound file in a model train as recited in claim 3, wherein:
    (a) each of said digital sound files has a default sound channel assigned; and
    (b) said processor routes said digital sound file to said default sound channel unless said default sound channel has the higher channel load.

7. The method for selecting a channel for the playing of a digital sound file in a model train as recited in claim 2, wherein said RMS voltage averaged over time for each of said sound channels is measured at said amplifier for each of said sound channels.

8. A method for selecting a channel for the playing of a digital sound file in a model train, comprising:
    (a) providing a processor;
    (b) providing a memory connected to said processor;
    (c) providing a first sound channel connected to said processor, said first sound channel including a first amplifier;
    (d) providing a second sound channel connected to said processor, said second sound channel including a second amplifier;
    (e) said processor determining a channel load for each of said first and second sound channels;
    (f) said processor retrieving a digital sound file from said memory; and
    (g) said processor routing said retrieved digital sound file to a sound channel having the lowest channel load.

9. The method for selecting a channel for the playing of a digital sound file in a model train as recited in claim 8, wherein said channel load for each of said sound channels is determined by determining an RMS voltage averaged over time for each of said sound channels.

10. The method for selecting a channel for the playing of a digital sound file in a model train as recited in claim 8, wherein said channel load for each of said sound channels is determined by determining a duty cycle for each of said sound channels.

11. The method for selecting a channel for the playing of a digital sound file in a model train as recited in claim 8, wherein:
    (a) each of said digital sound files has a default sound channel assigned; and
    (b) said processor routes said digital sound file to said default sound channel unless said default sound channel has the higher channel load.

12. The method for selecting a channel for the playing of a digital sound file in a model train as recited in claim 9, wherein:
    (a) each of said digital sound files has a default sound channel assigned; and (b) said processor routes said digital sound file to said default sound channel unless said default sound channel has the higher channel load.

13. The method for selecting a channel for the playing of a digital sound file in a model train as recited in claim 10, wherein:
   (a) each of said digital sound files has a default sound channel assigned; and
   (b) said processor routes said digital sound file to said default sound channel unless said default sound channel has the higher channel load.

14. The method for selecting a channel for the playing of a digital sound file in a model train as recited in claim 9, wherein said RMS voltage averaged over time for each of said sound channels is measured at said amplifier for each of said sound channels.

* * * * *